(12) United States Patent
Kim et al.

(10) Patent No.: US 9,602,032 B2
(45) Date of Patent: Mar. 21, 2017

(54) BLDC MOTOR SYSTEM INCLUDING PARAMETER DETECTING CIRCUIT AND OPERATING METHOD THEREOF

(71) Applicant: ELECTRONICS AND TELECOMMUNICATIONS RESEARCH INSTITUTE, Daejeon (KR)

(72) Inventors: Minki Kim, Daejeon (KR); Jung Hee Suk, Daejeon (KR); Yil Suk Yang, Daejeon (KR); Jimin Oh, Daejeon (KR); Sewan Heo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/862,139

(22) Filed: Sep. 22, 2015

(65) Prior Publication Data
US 2016/0094167 A1  Mar. 31, 2016

(30) Foreign Application Priority Data

Sep. 26, 2014 (KR) .......................... 10-2014-0129183
May 15, 2015 (KR) .......................... 10-2015-0068019

(51) Int. Cl.
*H02P 1/04* (2006.01)
*H02P 6/18* (2016.01)

(52) U.S. Cl.
CPC .................................. *H02P 6/182* (2013.01)

(58) Field of Classification Search
CPC ............. H02P 6/182; H02P 6/18; H02P 21/18
(Continued)

(56) References Cited

U.S. PATENT DOCUMENTS 5,272,392 A * 12/1993 Wong .................. H03K 17/063
327/109
6,512,341 B2 * 1/2003 Matsushiro ............. H02P 6/085
318/400.01
(Continued)

FOREIGN PATENT DOCUMENTS

JP      2008-113483 A     5/2008
KR  10-2008-0039299 A     5/2008

*Primary Examiner* — Rita Leykin
(74) *Attorney, Agent, or Firm* — Rabin & Berdo, P.C.

(57) ABSTRACT

Provided is a BrushLess Direct Current (BLDC) motor system including a motor driving circuit configured to control a pulse-width-modulation (PWM) inverter in a first operation mode or a second operation mode according to a control signal, and output a switching signal according to each operation mode, the PWM inverter configured to receive the switching signal to output first three-phase voltages having a first frequency in the first operation mode, and output second three-phase voltages having a second frequency in the second operation mode, a sensorless BLDC motor configured not to operate in the first operation mode by operating based on three-phase voltages having a frequency in a different band from the first frequency, and operate in the second mode by operating based on three-phase voltages having a frequency in an identical band to the second frequency, and a parameter detecting circuit configured to calculate parameter information on the sensorless BLDC motor in the first operation mode by using sensing voltages sensed in the PWM inverter.

16 Claims, 7 Drawing Sheets

(58) Field of Classification Search
USPC .... 318/400.09, 400.32, 400.01, 700, 400.33, 318/400.34, 807, 606–608, 400.14, 811, 318/599
See application file for complete search history.

(56) References Cited

U.S. PATENT DOCUMENTS

| | | | |
|---|---|---|---|
| 7,112,935 B2* | 9/2006 | Fujino | H02M 7/537 |
| | | | 318/433 |
| 8,583,265 B1* | 11/2013 | Schulz | H02P 6/10 |
| | | | 318/400.14 |
| 9,007,004 B2* | 4/2015 | Hunter | H02P 21/0003 |
| | | | 318/400.02 |
| 9,054,615 B2* | 6/2015 | Head | H02P 27/047 |
| 9,219,414 B2* | 12/2015 | Shao | H02M 3/158 |
| 9,358,639 B2* | 6/2016 | Brooks | B23K 26/0084 |
| 2002/0149342 A1 | 10/2002 | Nakata et al. | |
| 2006/0038523 A1* | 2/2006 | Fujino | H02M 7/537 |
| | | | 318/600 |
| 2006/0290312 A1 | 12/2006 | Nagai et al. | |
| 2007/0046246 A1 | 3/2007 | Borisavljevic | |
| 2007/0139022 A1* | 6/2007 | Yamamoto | H02M 5/297 |
| | | | 323/237 |
| 2009/0224714 A1* | 9/2009 | Serizawa | F02D 41/221 |
| | | | 318/434 |
| 2014/0159631 A1 | 6/2014 | Suk et al. | |
| 2014/0159632 A1 | 6/2014 | Kim et al. | |

* cited by examiner

BLDC MOTOR SYSTEM INCLUDING PARAMETER DETECTING CIRCUIT AND OPERATING METHOD THEREOF

CROSS-REFERENCE TO RELATED APPLICATIONS

This U.S. non-provisional patent application claims priority under 35 U.S.C. §119 of Korean Patent Application Nos. 10-2014-0129183, filed on Sep. 26, 2014, and 10-2015-0068019, filed on May 15, 2015, the entire contents of which are hereby incorporated by reference.

BACKGROUND

The present disclosure herein relates to a motor, and more particularly, to a BLDC motor system including a parameter detecting circuit and an operating method thereof.

A motor is a device for converting electric energy into mechanical energy by using a force that a current receives in a magnetic field. Motors are divided into an AC motor and a DC motor according a type of input power source. The AC motor rotates a rotor by supplying a current to stator windings to change a magnetic field. The DC motor rotates a rotor by supplying a constant current to the rotor. At this point, the DC motor allows the current to flow in a certain direction regardless of a position of the rotor by using a brush.

Recently, with the development of a power electronic control technique, a Brushless Direct Current (BLDC) motor is provided without a brush by using an electronic switching technique. Since the BLDC motor does not use a brush, there are not limitations in heat generation and brush abrasion due to mechanical friction. However, in order to control the BLDC motor, an additional device for detecting a rotor position is required.

SUMMARY

The present disclosure provides a BLDC motor system including a parameter detecting circuit having an improved accuracy and reliability, and an operating method thereof.

An embodiment of the inventive concept provides a BrushLess Direct Current (BLDC) motor system including: a motor driving circuit configured to control a pulse-width-modulation (PWM) inverter in a first operation mode or a second operation mode according to a control signal, and output a switching signal according to each operation mode; the PWM inverter configured to receive the switching signal to output first three-phase voltages having a first frequency in the first operation mode, and output second three-phase voltages having a second frequency in the second operation mode; a sensorless BLDC motor configured to receive the first three-phase voltages in the first operation mode, and receive the second three-phase voltages in the second operation mode; and a parameter detecting circuit configured to calculate parameter information on the sensorless BLDC motor in the first operation mode by using sensing voltages sensed in the PWM inverter.

In an embodiment, the PWM inverter may include: first and fourth power devices connected in series between a power node and a ground node; second and fifth power devices connected in parallel to the first and fourth power devices and connected in series between the power node and the ground node; third and sixth power devices connected in parallel to the second and fifth power devices and connected in series between the power node and the ground node; a first sensing device, one node of which being connected to a point where the other node of the second power device and one node of the fifth power device intersect, a gate of which being shared with the fifth power device, and the other node of which being connected in series to a first sensing resistor; a first sensing device, one node of which being connected to a point where the other node of the third power device and one node of the sixth power device intersect, a gate of which being shared with the sixth power device, and the other node of which being connected in series to a second sensing resistor; a third sensing device, one node of which being connected to a point where the other node of the first power device and one node of the fourth power device intersect, a gate of which being shared with the fourth power device, and the other node of which being connected in series to a third sensing resistor; the first sensing resistor connected in series between the other node of the first sensing device and the ground node; the second sensing resistor connected in series between the another node of the second sensing device and the ground node; and the third sensing resistor connected in series between the other node of the third sensing device and the ground node.

In an embodiment, the first to sixth power devices and the first to third sensing devices may be bidirectional transistors, respectively.

In an embodiment, the BLDC motor system may further include: a fourth sensing device, one node of which being connected to the power node, a gate of which being shared with the first power device, and the other node of which being connected in series to a fourth sensing resistor; a fifth sensing device, one node of which being connected to the power node, a gate of which being shared with the second power device, and the other node of which being connected in series to a fifth sensing resistor; a sixth sensing device, one node of which being connected to the power node, a gate of which being shared with the third power device, and the other node of which being connected in series to a sixth sensing resistor; the fourth sensing resistor connected in series between the other node of the fourth sensing device and the other node of the first power device; the fifth sensing resistor connected in series between the other node of the fifth sensing device and the other node of the second power device; and the sixth sensing resistor connected in series between the other node of the sixth sensing device and the other node of the third power device.

In an embodiment, the first to sixth power devices and the first to sixth sensing devices may be unidirectional transistors, respectively.

In an embodiment, the first to sixth power devices and the first to sixth sensing device may be bidirectional transistors, respectively.

In an embodiment, the parameter detecting circuit may include: a current detecting unit configured to output information on three-phase currents in the BLDC motor by using the sensing voltages; and a calculating unit configured to calculate the parameter information on the BLDC motor by using information on the three-phase currents output from the current detecting unit and information on three-phase voltages output from the motor driving circuit and preset to be applied to three-phases.

In an embodiment, in the second operation mode, the motor driving circuit may calculate three-phase back electromotive forces (EMFs) by using the parameter information output from the parameter detecting circuit, and calculate position information on a rotor in the BLDC motor.

In an embodiment, the first frequency may be higher than the second frequency.

In an embodiment, the PWM inverter may include: first to fourth power devices connected in series between a power node and a ground node; second and fifth power devices connected in parallel to the first and fourth power devices and connected in series between the power node and the ground node; third and sixth power devices connected in parallel to the second and fifth power devices and connected in series between the power node and the ground node; a first sensing device, one node of which being connected to the power node, a gate of which being shared with the first power device, and the other node of which being connected in series to a first sensing resistor; a second sensing device, one node of which being connected to the power node, a gate of which being shared with the second power device, and the other node of which being connected in series to a second sensing resistor; a third sensing device, one node of which being connected to the power node, a gate of which being shared with the third power device, and the other node of which being connected in series to a third sensing resistor; the first sensing resistor connected in series between the other node of the first sensing device and the other node of the first power device; the second sensing resistor connected in series between the other node of the second sensing device and the other node of the second power device; and the third sensing resistor connected in series between the other node of the third sensing device and the other node of the third power device.

In an embodiment, the first to sixth power devices and the first to third sensing device may be bidirectional transistors, respectively.

In an embodiments of the inventive concept, an operation method of a BLDC motor system including a BLDC motor and a PWM inverter configured to control the BLDC motor, includes: supplying, by the BLDC motor system, first three-phase voltages having a first frequency to the BLDC motor; obtaining, by the BLDC motor system, first information on three-phase currents on each phase in the BLDC motor according to the first three-phase voltages; calculating, by the BLDC motor system, parameter information PST on each phase in the BLDC motor by using the first information; supplying, by the BLDC motor system, second three-phase voltages having a second frequency to the BLDC motor; obtaining, by the BLDC motor system, second information on three-phase currents on each phase in the BLDC motor according to the second three-phase voltages; and detecting, by the BLDC motor system, a position of a rotor in the BLDC motor by using the parameter information PST and the second information.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, embodiments of the present invention will be described in detail with reference to the accompanying drawings so that the present invention can be easily practiced by those skilled in the art.

In order to control a sensorless BrushLess Direct Current (BLDC) motor, it is required to detect a rotor position of the BLDC motor. In addition, the rotor position may be obtained by conducting a calculation of back electromotive force (EMF) on the basis of information on three-phase parameters of the BLDC motor. The BLDC motor system according to an embodiment of the inventive concept may calculate parameters in the BLDC motor by using a current that is sensed in the pulse width modulation (PWM) inverter, and then obtain position information on the rotor on the basis of the calculated parameters. For conciseness of explanation, the BLDC motor system according to an embodiment of the inventive concept will be described to detect the rotor position. However, the embodiment of the inventive concept is not limited hereto, and speed information on the BLDC may be obtained based on the detected rotor position.

Figure 1:
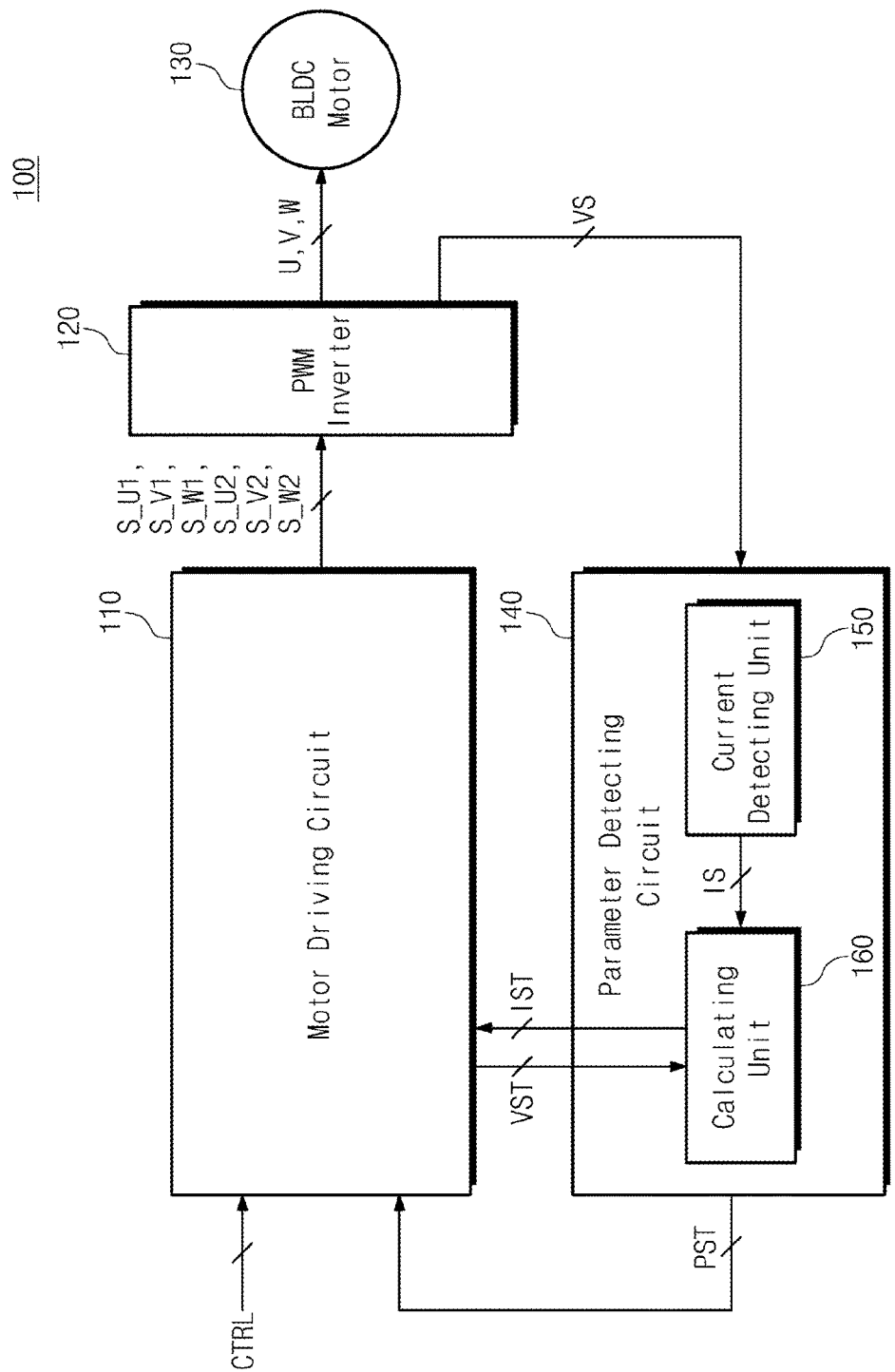
FIG. 1 is a block diagram of a BLDC motor system according to an embodiment of the inventive concept.

FIG. 1 is a block diagram of a BLDC motor system including a parameter detecting circuit according to an embodiment of the inventive concept. Referring to FIG. 1, a BLDC motor system 100 includes a motor driving circuit 110, a PWM inverter 120, a BLDC motor 130, and a parameter detecting circuit 140.

The motor driving circuit 110 may control the PWM inverter 120 on the basis of a control signal CTRL and parameter information PST. The control driving circuit 110 may operate the BLDC motor system 100 according to an embodiment of the inventive concept in a first or second operation mode according to the control signal CTRL. For example, the control signal CTRL may include information on the first operation mode of the BLDC motor 130. For example, in the first operation mode, the motor driving circuit 110 may receive the control signal CTRL from an external device. The control signal CTRL may be a signal generated based on information such as an operation mode, target speed, target torque, or the like of the BLDC motor 160. The motor driving circuit 110 may store information on phases, magnitudes, frequencies, and a neutral point voltage of three-phase voltages U, V, and W applied to each phase of the BLDC motor, which are determined according to the control signal CTRL.

The motor driving circuit 110 may control a plurality of switches included in the PWM inverter 120 on the basis of the control signal CTRL and parameter information PST. For example, when the BLDC motor system 100 operates based on the three-phase voltages, the PWM inverter 120 may include six power switches. In this case, the motor driving circuit 110 may output six switching signals S_U1, S_U2, S_V1, S_V2, S_W1, and S_W2 for controlling the six power switches.

For example, the motor driving circuit 110 may output first switching signals S_U1, S_U2, S_V1, S_V2, S_W1, and S_W2 on the basis of information on the first operation mode. For example, in the first operation mode, the motor driving circuit 110 may output information VST, for example, phase and magnitude information, on pre-stored U-phase voltage U, V-phase voltage V, and W-phase voltage W applied to the BLDC motor 130 to the calculating unit

160. For example, in the first operation mode, the motor driving circuit 110 may receive information IST, for example, phase and magnitude information, on U-phase, V-phase, and W-phase currents flowing of the BLDC motor 130 from the calculating unit 160. For example, in the first operation mode, the motor driving circuit 110 may receive and store the parameter information PST from the parameter detecting circuit 140.

For example, in the second operation mode, the motor driving circuit 110 may use the parameter information PST stored in the first operation mode. For example, in the second operation mode, the motor driving circuit 110 may output switching signals S_U1, S_U2, S_V1, S_V2, S_W1, and S_W2 to generate second three-phase voltages U, V, and W applied from the PWM inverter 120 to the BLDC motor 130. For example, in the second operation mode, the motor driving circuit 110 may receive information IST, for example, phase and magnitude information, on U-phase, V-phase, and W-phase currents applied to the BLDC motor 130 from the calculating unit 160

The PWM inverter 120 receives the switching signals S_U1, S_U2, S_V1, S_V2, S_W1, and S_W2 output from the motor driving circuit 110 to generate the three-phase voltages U, V, and W. For example, the phases of the three-phase voltages may have differences of 120 degrees in electrical angle from each other. For example, the three-phase voltages U, V, and W may be provided to the BLDC motor 130. For example, the three-phase voltages U, V, and W may be provided to the BLDC motor 130 in a sinusoidal wave format.

For example, the PWM inverter 120 may output first three-phase voltages U, V, and W having the first frequency in the first operation mode. For example, the PWM inverter 120 may output second three-phase voltages U, V, and W having the second frequency in the second operation mode. The first frequency means a frequency having a higher band than the second frequency. Therefore, in the first operation, when the first three-phase voltages having the first frequency is applied to the BLDC motor 130, the rotor of the BLDC motor 130 does not rotate.

Also, the PWM inverter 120 of the inventive concept includes power devices outputting the three-phase voltages U, V, and W to the BLDC motor 130, sensing devices connected to the power devices in parallel, and sensing resistors connected to the sensing devices in serial to measure voltages. The voltages VS, for example, U-phase, V-phase, and W-phase sensing voltages, measured at the sensing resistors are output to the parameter detecting circuit 140. An internal structure of the PWM inverter 120 will be described in detail with reference to FIGS. 2 to 4.

The BLDC motor 130 may operate based on the three-phase voltages U, V, and W. For example, the BLDC motor 130 may be provided in a sensorless type without a position sensor. For example, the BLDC motor 130 may include a rotor and a stator. The rotor may be provided with a permanent magnet. The three-phase voltages U, V, and W are applied to the stator windings. The fundamental wave of the three-phase voltages U, V, and W may be a sinusoidal wave having a specified frequency and phase. Accordingly, a magnetic field generated from the stator by the three-phase voltages U, V, and W varies. On the basis of a direction of the varied magnetic field, an electromagnetic force is generated according to electro-magnetic induction. The rotor rotates by the generated electrical force. A rotational magnetic field is generated by rotations of the rotor. Accordingly, a back EMF is generated according to the electro-magnetic induction.

As described above, when the three-phase voltages U, V, and W have may have differences of 120 degrees in electrical angle from each other, the three-phase back EMFs generated from the BLDC motor 160 have differences of 120 degrees in electrical angle from each other. For example, in the first operation mode, the BLDC motor 130 does not move because it receives first three-phase voltages U, V, and W having the first frequency that is different from the operation frequency of the BLDC motor 130. For example, in the second operation mode, the BLDC motor 130 moves because it receives second three-phase voltages U, V, and W having the second frequency that is identical to the operation frequency of the BLDC motor 130.

The parameter detecting circuit 140 may receive sensing voltages VS output from the sensing resistors in the PWM inverter 120 to output parameter information PST on each phase in the BLDC motor 130 to the motor driving circuit 110. The parameter detecting circuit 140 includes a current detecting unit 150 and a calculating unit 160.

The current detecting unit 150 receives the sensing voltages VS to output information IS on three-phase currents of the BLDC motor 130. For example, an internal structure of the current detecting unit 150 will be described with reference to FIG. 5.

The calculating unit 160 may calculate the parameter information PST on each phase in the BLDC motor 130 on the basis of the information IS on the three-phase currents of the BLDC motor 130, which is output form the current detecting unit 150, and the information VST on three-phase voltages of the BLDC motor 130, which is output from the motor driving circuit 110. For example, the information VST on the three-phase voltages of the BLDC motor 130 may include information on a magnitude, phase, and frequency of a voltage applied to each phase of the BLDC motor 130. For example, in the first and second operation modes, the calculating unit 160 may output the information IST on three-phase currents of the BLDC motor 130. For example, the information IST on the three-phase currents of the BLDC motor 130 may include information on a magnitude and phase of a current flowing to each phase of the BLDC motor 130.

For example, parameter information PST on each phase in the BLDC motor 130 means information on resistance and impedance of each phase in the BLDC motor 130. For example, in the first operation mode, the calculating unit 160 may output the parameter information PST on each phase in the BLDC motor 130 to the motor driving circuit 110. For example, in the second operation mode, the calculating unit 160 may neglect or not calculate the parameter information PST on each phase in the BLDC motor 130. The internal structure of the calculating unit 160 will be described in detail with reference to FIG. 6.

According to an embodiment, when the BLDC motor system 100 is driven in the first operation mode, the parameter detecting circuit 140 may calculate the parameter information PST on each phase in the BLDC motor 130 by using the voltages measured at the sensing resistors VS and output the calculated parameter information PST to the motor driving circuit 110. The motor driving circuit 110 stores the received parameter information PST. The motor driving circuit 110 may detect the rotor position of the BLDC motor 130 on the basis of the pre-stored parameter information PST, the information IST on the three-phase currents of the BLDC motor 130, and the information VST on the three-phase voltages.

When the BLDC motor system 100 is driven in the second operation mode, the parameter detecting circuit 140 may not output the parameter information PST on each phase in the BLDC motor 130 to the motor driving circuit 110. In other words, when the BLDC motor system 100 is driven in the second operation mode, the motor driving circuit 110 uses the parameter information PST stored in the first operation mode. In addition, the motor driving circuit 110 may detect the rotor position of the BLDC motor 130 by using the information IST on the three-phase currents I_U, I_V, and I_W of the BLDC motor 130 and the information VST on the three-phase voltages pre-stored in the motor driving circuit 110.

Figure 2:
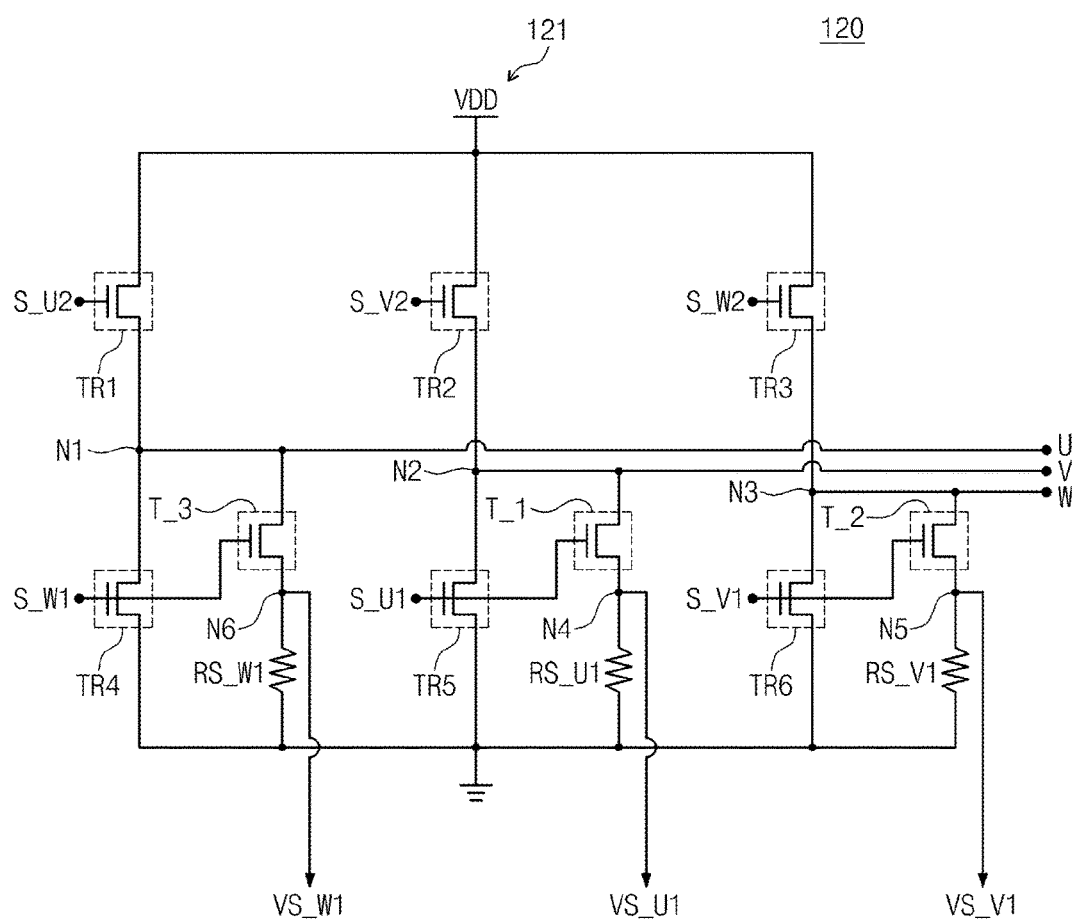
FIGS. 2 to 4 illustrate an internal structure of a PWM inverter according to an embodiment of the inventive concept.
Figure 3:
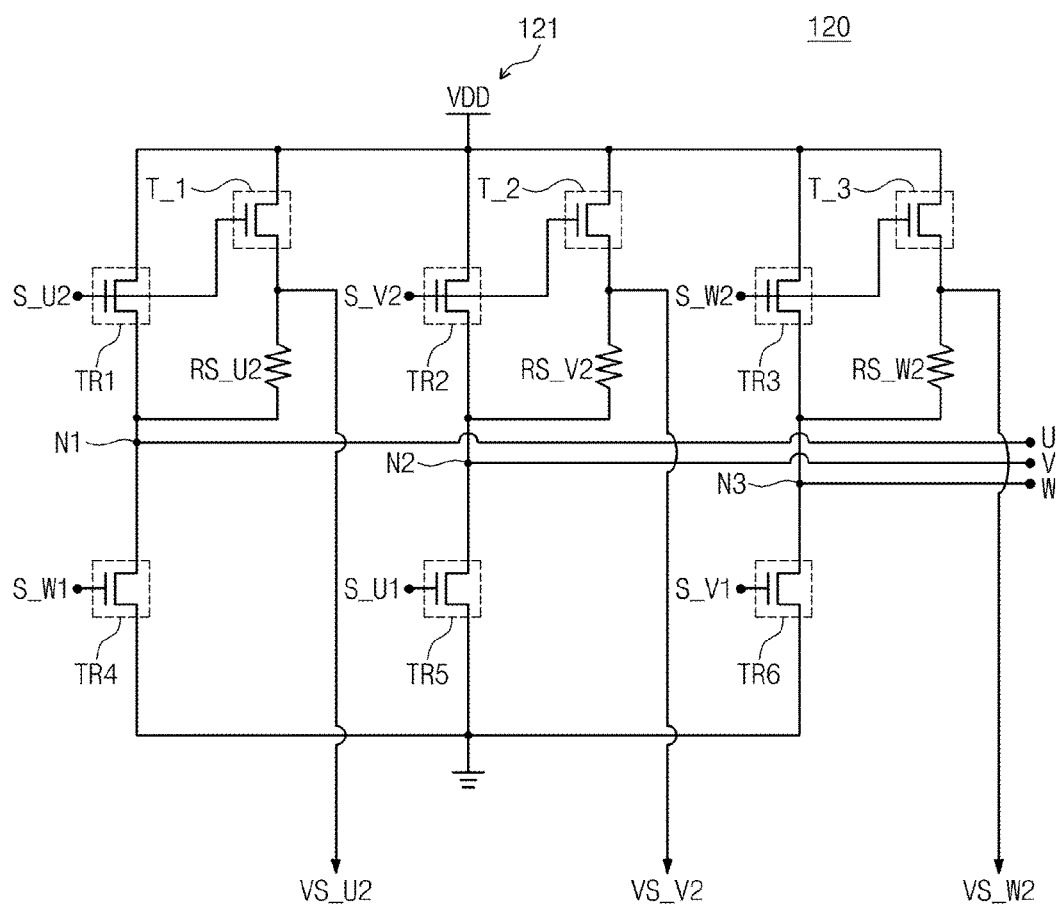
Figure 4:
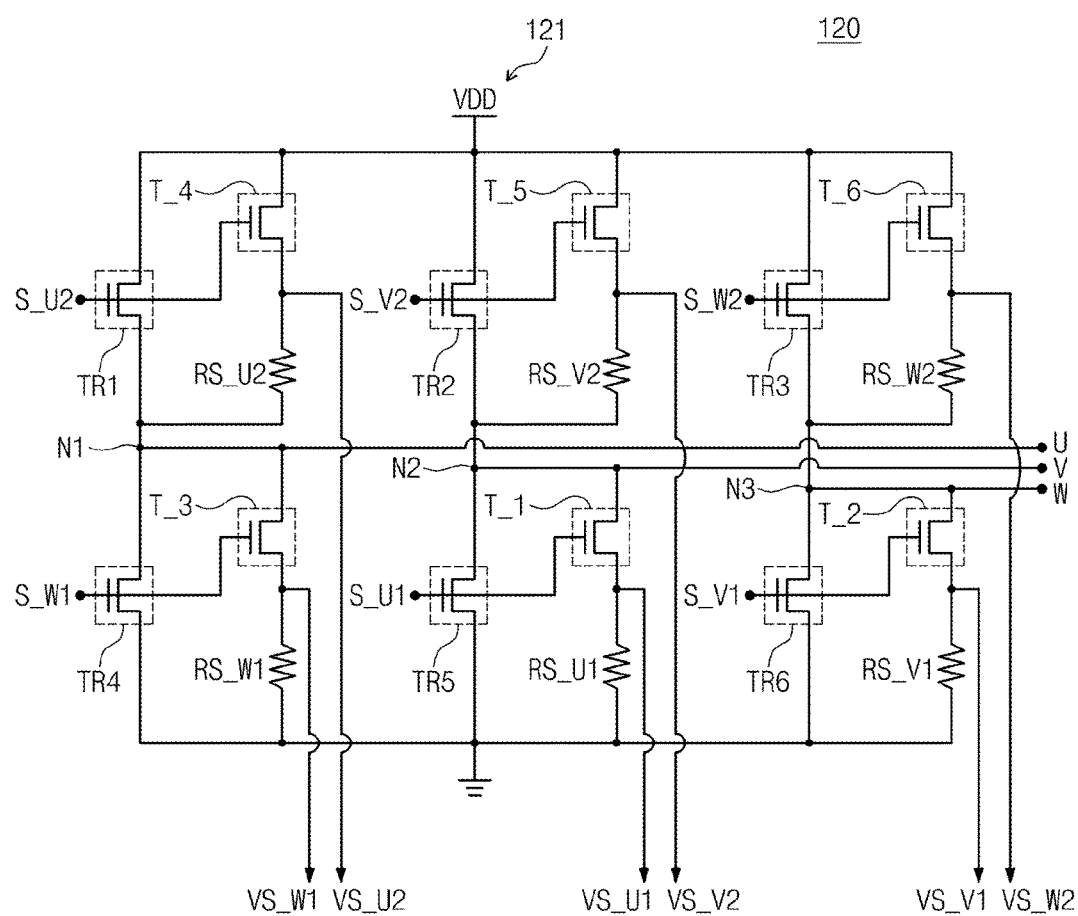

FIGS. 2 to 4 are circuit diagrams illustrating the PWM inverter 120 according to an embodiment of the inventive concept.

Referring to FIG. 2, the PWM inverter 120 includes a power node 121, first to sixth power devices TR1, TR2, TR3, TR4, TR5, and TR6 operating in response to the switching signals S_U1, S_U2, S_V1, S_V2, S_W1, and S_W2 output from the PWM modulating unit 120, first to third sensing devices T_1, T_2, and T_3 respectively connected in parallel to the fourth to sixth power devices TR4, TR5, and TR6 operating in response to a part of switching signals S_U1, S_V1, and S_W1, and first to third sensing resistors RS_U1, RS_V1, and RS_W1.

For example, one node of the first power device TR1 is connected to the power node 121, and the other node of the first power device TR1 is connected to one node of the fourth power device TR4. And a gate of the first power device TR1 receives the switching signal S_U2. For example, one node of the second power device TR2 is connected to the power node 121, and the other node of the second power device TR2 is connected to one node of the fifth power device TR5. And a gate of the second power device TR2 receives the switching signal S_V2. For example, one node of the third power device TR3 is connected to the power node 121, and the other node of the third power device TR3 is connected to one node of the sixth power device TR6. And a gate of the third power device TR3 receives the switching signal S_W2. For example, one node of the fourth power device TR4 is connected to the other node of the first power device TR1, and the other node of the fourth power device TR4 is connected to a ground node. And a gate of the fourth power device TR4 receives the switching signal S_W1. For example, one node of the fifth power device TR5 is connected to the other node of the second power device TR2, and the other node of the fifth power device TR5 is connected to the ground node. And a gate of the fifth power device TR5 receives the switching signal S_U1. For example, one node of the sixth power device TR6 is connected to the other end of the third power device TR3, and the other node of the sixth power device TR6 is connected to the ground node. And a gate of the sixth power device TR6 receives the switching signal S_V1.

For example, one node of the first sensing device T_1 is connected to the one node of the fifth power device TR5, and the other node of the first sensing device T_1 is connected to the first sensing resistor RS_U1. And a gate of the first sensing device T_1 is connected to the gate of the fifth power device TR5 to receive the switching signal S_U1. For example, one node of the second sensing device T_2 is connected to the one node of the sixth power device TR6, and the other node of the second sensing device T_2 is connected to the second sensing resistor RS_V1. And a gate of the second sensing device T_2 is connected to the gate of the sixth power device TR6 to receive the switching signal S_V1. For example, one node of the third sensing device T_3 is connected to the one node of the fourth power device TR4, and the other node of the third sensing device T_3 is connected to the third sensing resistor RS_W1. And a gate of the third sensing device T_3 is connected to the gate of the fourth power device TR4 to receive the switching signal S_W1.

For example a first node N1 corresponds to a point where the other node of the first power device TR1, the one node of the fourth power device TR4, and the one node of the third sensing device T_3 intersect. For example a second node N2 corresponds to a point where the other node of the second power device TR2, the one node of the fifth power device TR5, and the one node of the first sensing device T_1 intersect. For example a third node N3 corresponds to a point where the other node of the third power device TR3, the one node of the sixth power device TR6, and the one node of the second sensing device T_2 intersect.

The PWM inverter 120 outputs the three-phase voltages U, V, and W in response to the received switching signals S_U1, S_U2, S_V1, S_V2, S_W1, and S_W2. For example, the U-phase voltage U of the BLDC motor 130 indicates a potential difference between the first and second nodes N1 and N2. For example, the V-phase voltage V of the BLDC motor 130 indicates a potential difference between the second and third nodes N2 and N3. For example, the W-phase voltage W of the BLDC motor 130 indicates a potential difference between the third and first nodes N3 and N1. The power node 121 provides a DC power voltage VDD so that the PWN inverter 120 outputs the three-phase voltages U, V, and W. The structure shown in FIG. 2 may be used when the first to sixth power devices TR1, TR2, TR3, TR4, TR5, and TR6, and the first to third sensing devices T_1, T_2, and T_3 are a bidirectional device, for example, a Metal Oxide Silicon Field Effect Transistor (MOSFET). The gates of the first to third sensing devices T_1, T_2, and T_3, to which a part of switching signals S_U1, S_V1, and S_W1 are applied, are commonly connected to the gates of the fourth to sixth power devices TR4, TR5, and TR6.

Figure 5:
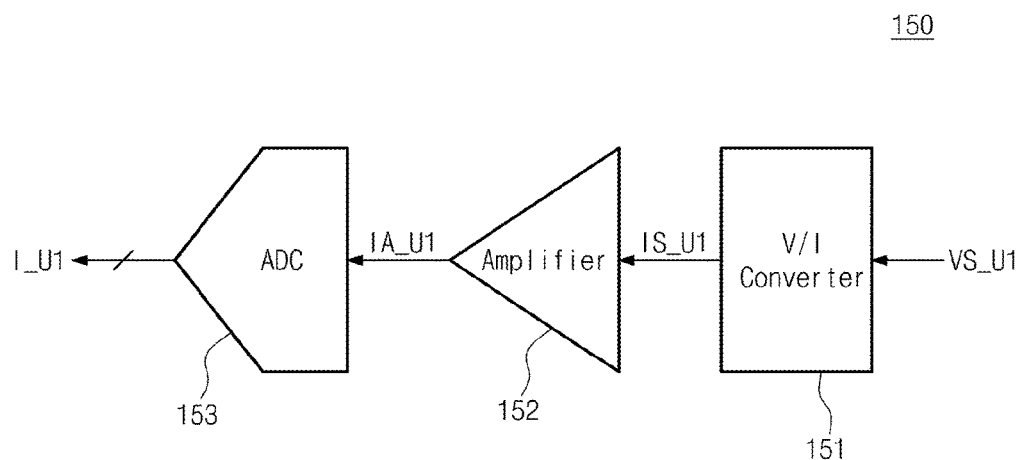
FIG. 5 illustrates a current detecting unit according to an embodiment of the inventive concept.

Referring to FIGS. 1, 2, and 5, for convenience of explanation, it is assumed that when the first to fifth power devices TR1 and TR5 connected to the U-phase of the BLDC motor 130 are turned ON, a current flowing through the U-phase is called I-U, a resistance value of the fifth power device TR5 is called RDS_U1, and a size ratio of the first sensing device T_1 to the fifth power device TR5 is a multiple of α. At this point, a sensing voltage VS_U1 sensed from the first sensing resistor RS_U1 and output to the parameter detecting circuit 140 may be expressed as the following Equation (1).

$$VS\_U1 = \frac{RDS\_U1 \cdot I\_U}{RDS\_U1 + (\alpha RDS\_U1 + RS\_U1)} \cdot RS\_U1 \qquad (1)$$
$$= \frac{RDS\_U1 \cdot I\_U}{\frac{RDS\_U1 \cdot (\alpha + 1)}{RS\_U1} + 1}$$

A V/I converter 151 in the current detecting unit 150 may calculate a current IS_U1 flowing through the first sensing device T_1 by dividing the sensing voltage VS_U1 by the first sensing resistance value RS_U1. At this point, the current IS_U1 flowing through the first sensing device T_1 is proportional to the U-phase current I_U. The current IS_U1 flowing through the first sensing device T_1 may be expressed as the following Equation (2).

$$IS\_U1 = \frac{RDS\_U1 \cdot I\_U}{RDS\_U1 + (\alpha RDS\_U1 + RS\_U1)} \quad (2)$$

Similarly, it is assumed that when the power devices TR2 and TR6 connected to the V-phase of the BLDC motor 130 are turned ON, a current flowing through the V-phase is called I-V, a resistance value of the power device TR6 is called RDS_V1, and a size ratio of the second sensing device T_2 to the sixth power device TR6 is a multiple of α. At this point, a sensing voltage VS_V1 sensed from the second sensing resistor RS_V1 and output to the parameter detecting circuit 140 is expressed as the following Equation (3).

$$VS\_V1 = \frac{RDS\_V1 \cdot I\_V}{RDS\_V1 + (\alpha RDS\_V1 + RS\_V1)} \cdot RS\_V1 \quad (3)$$

$$= \frac{RDS\_V1 \cdot I\_V}{\frac{RDS\_V1 \cdot (\alpha + 1)}{RS\_V1} + 1}$$

The V/I converter 151 in the current detecting unit 150 may calculate a current IS_V1 flowing through the second sensing device T_2 by dividing the sensing voltage VS_V1 by the second sensing resistance value RS_V1. At this point, the current IS_V1 flowing through the second sensing device T_2 is proportional to the V-phase current I_V. The current IS_V1 flowing through the second sensing device T_2 may be expressed as the following Equation (4).

$$IS\_V1 = \frac{RDS\_V1 \cdot I\_V}{RDS\_V1 + (\alpha RDS\_V1 + RS\_V1)} \quad (4)$$

Similarly, it is assumed that when the power devices TR3 and TR4 connected to the W-phase of the BLDC motor 130 are turned ON, a current flowing through the W-phase is called I-W, a resistance value of the power device TR4 is called RDS_W1, and a size ratio of the third sensing device T_3 to the fourth power device TR4 is a multiple of α. At this point, a sensing voltage VS_W1 sensed from the third sensing resistor RS_W1 and output to the parameter detecting circuit 140 is expressed as the following Equation (5).

$$VS\_W1 = \frac{RDS\_W1 \cdot I\_W}{RDS\_W1 + (\alpha RDS\_W1 + RS\_W1)} \cdot RS\_W1 \quad (5)$$

$$= \frac{RDS\_W1 \cdot I\_W}{\frac{RDS\_W1 \cdot (\alpha + 1)}{RS\_W1} + 1}$$

The V/I converter 151 in the current detecting unit 150 may calculate a current IS_W1 flowing through the third sensing device T_3 by dividing the sensing voltage VS_W1 by the third sensing resistance value RS_W1. At this point, the current IS_W1 flowing through the third sensing device T_3 is proportional to the W-phase current I_W. The current IS_W1 flowing through the third sensing device T_3 may be expressed as the following Equation (6).

$$IS\_W1 = \frac{RDS\_W1 \cdot I\_W}{RDS\_W1 + (\alpha RDS\_W1 + RS\_W1)} \quad (6)$$

Referring to FIG. 3, the PWM inverter 120 includes a power node 121, first to sixth power devices TR1, TR2, TR3, TR4, TR5, and TR6 operating in response to the switching signals S_U1, S_U2, S_V1, S_V2, S_W1, and S_W2 output from the PWM modulating unit 120, first to third sensing devices T_1, T_2, and T_3 respectively connected in parallel to the first to third power devices TR1, TR2, and TR3 operating in response to a part of switching signals S_U2, S_V2, and S_W2, and first to third sensing resistors RS_U2, RS_V2, and RS_W2. For example, one node of the first power device TR1 is connected to the power node 121, and the other node of the first power device TR1 is connected to one node of the fourth power device TR4. In addition, a gate of the first power device TR1 receives the switching signal S_U2. For example, one node of the second power device TR2 is connected to the power node 121, and the other node of the second power device TR2 is connected to one node of the fifth power device TR5. In addition, a gate of the second power device TR2 receives the switching signal S_V2. For example, one node of the third power device TR3 is connected to the power node 121, and the other node of the third power device TR3 is connected to one node of the sixth power device TR6. In addition, a gate of the third power device TR3 receives the switching signal S_W2. For example, one node of the fourth power device TR4 is connected to the other node of the first power device TR1, and the other node of the fourth power device TR4 is connected to a ground node. In addition, a gate of the fourth power device TR4 receives the switching signal S_W1. For example, one node of the fifth power device TR5 is connected to the other node of the second power device TR2, and the other node of the fifth power device TR5 is connected to the ground node. In addition, a gate of the fifth power device TR5 receives the switching signal S_U1. For example, one node of the sixth power device TR6 is connected to the other node of the third power device TR3, and the other node of the sixth power device TR6 is connected to the ground node. In addition, a gate of the sixth power device TR6 receives the switching signal S_V1.

For example, one node of the first sensing device T_1 is connected to the one node of the first power device TR1, and the other node of the first sensing device T_1 is connected to the first sensing resistor RS_U2. In addition, a gate of the first sensing device T_1 is connected to the gate of the first power device TR1 to receive the switching signal S_U2. For example, one node of the second sensing device T_2 is connected to the one node of the second power device TR2, and the other node of the second sensing device T_2 is connected to the second sensing resistor RS_V2. In addition, a gate of the second sensing device T_2 is connected to the gate of the second power device TR2 to receive the switching signal S_V2. For example, one node of the third sensing device T_3 is connected to the one node of the third power device TR3, and the other node of the third sensing device T_3 is connected to the third sensing resistor RS_W2. In addition, a gate of the third sensing device T_3 is connected to the gate of the third power device TR3 to receive the switching signal S_W2.

For example a first node N1 corresponds to a point where the other node of the first power device TR1 and the one node of the fourth power device TR4 intersect. For example a second node N2 corresponds to a point where the other node of the second power device TR2 and the one node of the fifth power device TR5 intersect. For example a third node N3 corresponds to a point where the other node of the third power device TR3 and the one node of the sixth power device TR6 intersect.

The structure shown in FIG. 3 may be used when the first to sixth power devices TR1, TR2, TR3, TR4, TR5, and TR6, and the first to third sensing devices T_1, T_2, and T_3 are a bidirectional device, for example, a MOSFET. The gates of the first to third sensing devices T_1, T_2, and T_3, to which a part of switching signals S_U2, S_V2, and S_W2 are applied, are commonly connected to the gates of the first to third power devices TR1, TR2, and TR3.

Currents IS_U2, IS_V2, and IS_W2 flowing through the first to third sensing devices T_1, T_2, and T_3 may be obtained with Equations (1) to (6). For example, calculation of the current IS_U2 flowing through the first sensing device T_1 is conducted by substituting the resistance value RDS_U2 of the first power device TR1 for the resistance value RDS_U1 of the fifth power device TR5, which is a variable of Equations (1) and (2). In addition, a size ratio of the first sensing device T_1 to the first power device TR1 is defined as a multiple of α. For example, calculation of the current IS_V2 flowing through the second sensing device T_2 is conducted by substituting the resistance value RDS_V2 of the second power device TR2 for the resistance value RDS_V1 of the sixth power device TR6, which is a variable of Equations (3) and (4). In addition, a size ratio of the second sensing device T_2 to the second power device TR2 is defined as a multiple of α. For example, calculation of the current IS_W2 flowing through the third sensing device T_3 is conducted by substituting the resistance value RDS_W2 of the third power device TR3 for the resistance value RDS_W1 of the fourth power device TR4, which is a variable of Equations (5) and (6). In addition, a size ratio of the third sensing device T_3 to the third power device TR3 is defined as a multiple of α.

The sensing voltages VS_U2, VS_V2, and VS_W2 respectively measured at the sensing resistors RS_U2, RS_V2, and RS_W2 may be output to the parameter detecting circuit 140.

Referring to FIG. 4, the PWM inverter 120 includes a power node 121, first to sixth power devices TR1, TR2, TR3, TR4, TR5, and TR6 operating in response to the switching signals S_U1, S_U2, S_V1, S_V2, S_W1, and S_W2 output from the PWM modulating unit 120, first to sixth sensing devices T_1, T_2, T_3, T_4, T_5, and T_6 respectively connected in parallel to the first to sixth power devices TR1 to TR6, and first to sixth sensing resistors RS_U1, RS_V1, RS_W1, RS_U2, RS_V2, and RS_W2.

For example, one node of the first power device TR1 is connected to the power node 121, and the other node of the first power device TR1 is connected to one node of the fourth power device TR4. In addition, a gate of the first power device TR1 receives the switching signal S_U2. For example, one node of the second power device TR2 is connected to the power node 121, and the other node of the second power device TR2 is connected to one node of the fifth power device TR5. In addition, a gate of the second power device TR2 receives the switching signal S_V2. For example, one node of the third power device TR3 is connected to the power node 121, and the other node of the third power device TR3 is connected to one node of the sixth power device TR6. In addition, a gate of the third power device TR3 receives the switching signal S_W2. For example, one node of the fourth power device TR4 is connected to the other node of the first power device TR1, and the other node of the fourth power device TR4 is connected to a ground node. In addition, a gate of the fourth power device TR4 receives the switching signal S_W1. For example, one node of the fifth power device TR5 is connected to the other node of the second power device TR2, and the other node of the fifth power device TR5 is connected to the ground node. In addition, a gate of the fifth power device TR5 receives the switching signal S_U1. For example, one node of the sixth power device TR6 is connected to the other node of the third power device TR3, and the other node of the sixth power device TR6 is connected to the ground node. In addition, a gate of the sixth power device TR6 receives the switching signal S_V1.

For example, one node of the first sensing device T_1 is connected to the one node of the fifth power device TR5, and the other node of the first sensing device T_1 is connected to the first sensing resistor RS_U1. In addition, a gate of the first sensing device T_1 is connected to the gate of the fifth power device TR5 to receive the switching signal S_U1. For example, one node of the second sensing device T_2 is connected to the one node of the sixth power device TR6, and the other node of the second sensing device T_2 is connected to the second sensing resistor RS_V1. In addition, a gate of the second sensing device T_2 is connected to the gate of the sixth power device TR6 to receive the switching signal S_V1. For example, one node of the third sensing device T_3 is connected to the one node of the fourth power device TR4, and the other node of the third sensing device T_3 is connected to the third sensing resistor RS_W1. In addition, a gate of the third sensing device T_3 is connected to the gate of the fourth power device TR4 to receive the switching signal S_W1.

For example, one node of the fourth sensing device T_4 is connected to the one node of the first power device TR1, and the other node of the fourth sensing device T_4 is connected to the fourth sensing resistor RS_U2. In addition, a gate of the fourth sensing device T_4 is connected to the gate of the first power device TR1 to receive the switching signal S_U2. For example, one node of the fifth sensing device T_5 is connected to the one node of the second power device TR2, and the other node of the fifth sensing device T_5 is connected to the fifth sensing resistor RS_V2. In addition, a gate of the fifth sensing device T_5 is connected to the gate of the second power device TR2 to receive the switching signal S_V2. For example, one node of the sixth sensing device T_6 is connected to the one node of the third power device TR3, and the other node of the sixth sensing device T_6 is connected to the sixth sensing resistor RS_W2. In addition, a gate of the sixth sensing device T_6 is connected to the gate of the third power device TR3 to receive the switching signal S_W2.

For example a first node N1 corresponds to a point where the other node of the first power device TR1 and the one node of the fourth power device TR4 intersect. For example a second node N2 corresponds to a point where the other node of the second power device TR2 and the one node of the fifth power device TR5 intersect. For example a third node N3 corresponds to a point where the other node of the third power device TR3 and the one node of the sixth power device TR6 intersect.

The structure as shown in FIG. 4 may be used when the first to sixth power devices TR1 to TR6 and the first to sixth sensing devices T_1 to T_6 are a unidirectional device, for example, an Insulated Gate Bipolar Transistor (IGBT). Gates of the sensing devices T_1, T_2, T_3, T_4, T_5, and T_6, to which switching signals S_U1, S_U2, S_V1, S_V2, S_W1, and S_W2 are applied, are commonly connected to the power devices TR1, TR2, TR3, TR4, TR5, and TR6, respectively.

Currents IS_U1, IS_V1, and IS_W1 flowing through the first to third sensing devices T_1, T_2, and T_3 may be obtained with Equations (1) to (6). Currents IS_U2, IS_V2, and IS_W2 flowing through the fourth to sixth sensing devices T_4, T_5, and T_6 may be obtained with Equations (1) to (6). At this point, calculation of the current IS_U2 flowing through the fourth sensing device T_4 is conducted by substituting the resistance value RDS_U2 of the first power device TR1 for the resistance value RDS_U1 of the fifth power device TR5, which is a variable of Equations (1) and (2). In addition, a size ratio of the fourth sensing device T_4 to the first power device TR1 is defined as a multiple of α. In addition, calculation of the current IS_V2 flowing through the fifth sensing device T_5 is conducted by substituting the resistance value RDS_V2 of the second power device TR2 for the resistance value RDS_V1 of the sixth power device TR6, which is a variable of Equations (3) and (4). In addition, a size ratio of the fifth sensing device T_5 to the second power device TR2 is defined as a multiple of α. In addition, calculation of the current IS_W2 flowing through the sixth sensing device T_6 is conducted by substituting the resistance value RDS_W2 of the third power device TR3 for the resistance value RDS_W1 of the fourth power device TR4, which is a variable of Equations (5) and (6). In addition, a size ratio of the sixth sensing device T_6 to the third power device TR3 is defined as a multiple of a.

The sensing voltages VS_U1, VS_V1, VS_W1, VS_U2, VS_V2, and VS_W2 respectively measured from the sensing resistors RS_U1, RS_V1, RS_W1, RS_U2, RS_V2, and RS_W2 may be output to the parameter detecting circuit 140. In addition, the parameter detecting circuit 140 may calculate a set of information IS_U1, IS_V1, and IS_W1 on a sensing current of each phase by using one of or an average or weighted average of the sensing voltages VS_U1, VS_V1, VS_W1, VS_U2, VS_V2, and VS_W2.

FIG. 5 illustrates the current detecting unit 150 according to an embodiment of the inventive concept. For conciseness of explanation, a description will be provided by assuming a case where an internal structure of the PWM inverter 120 is the same as that shown in FIG. 2, and the first and fifth power devices TR1 and TR5 related to the U-phase of the PWM inverter 120 are turned ON. Other parts of the current detecting unit 150 related to the V- and W-phases may have the same structure as that shown in FIG. 5. The current detecting unit 150 includes the V/I converter 151, an amplifier 152, and an analog-to-digital converter (ADC) 153.

The current detecting unit 150 may be positioned in the parameter detecting circuit 140 and receive the sensing voltage VS_U1 output from the sensing resistor RS_U1 to output information I_U1 on a U-phase current I_U in the BLDC motor 130. In detail, the V/I converter 151 divides the received sensing voltage VS_U1 by the first sensing resistance value RS_U1 to output a U-phase sensing current IS_U1.

The amplifier 152 may receive the U-phase sensing current IS_U1 output from the V/I converter 151 to output an amplified U-phase sensing current IA_U1. At this point, a controller (not illustrated) in the current detecting unit 150 may adjust a gain of the amplifier 152 according to a level of the sensing current IS_U1 and resistance ratios between power devices, sensing devices, and sensing resistors in the PWM inverter 120. For example, the U-phase sensing current IA_U1 passing through the amplifier 152 may be the current I_U flowing through the U-phase.

The ADC 153 may receive the U-phase sensing current IA_U1 passing through the amplifier 152 to output information I_U1 on the U-phase current I_U. The information I_U1 on the U-phase current I_U may be output to the calculating unit 160. Similarly, through a process illustrated in FIG. 5, other sensing voltages VS_V1 and VS_W1 may also be converted to a set of information I_V1 and I_W1 on the V- and W-phase currents I_V and I_W and output to the calculating unit 160. In addition, when the inside of the PWM inverter 120 is configured as shown in FIGS. 3 and 4, each sensing voltage may also be converted to information on the each phase current to be output to the calculating unit 160 through the process as illustrated in FIG. 5

Figure 6:
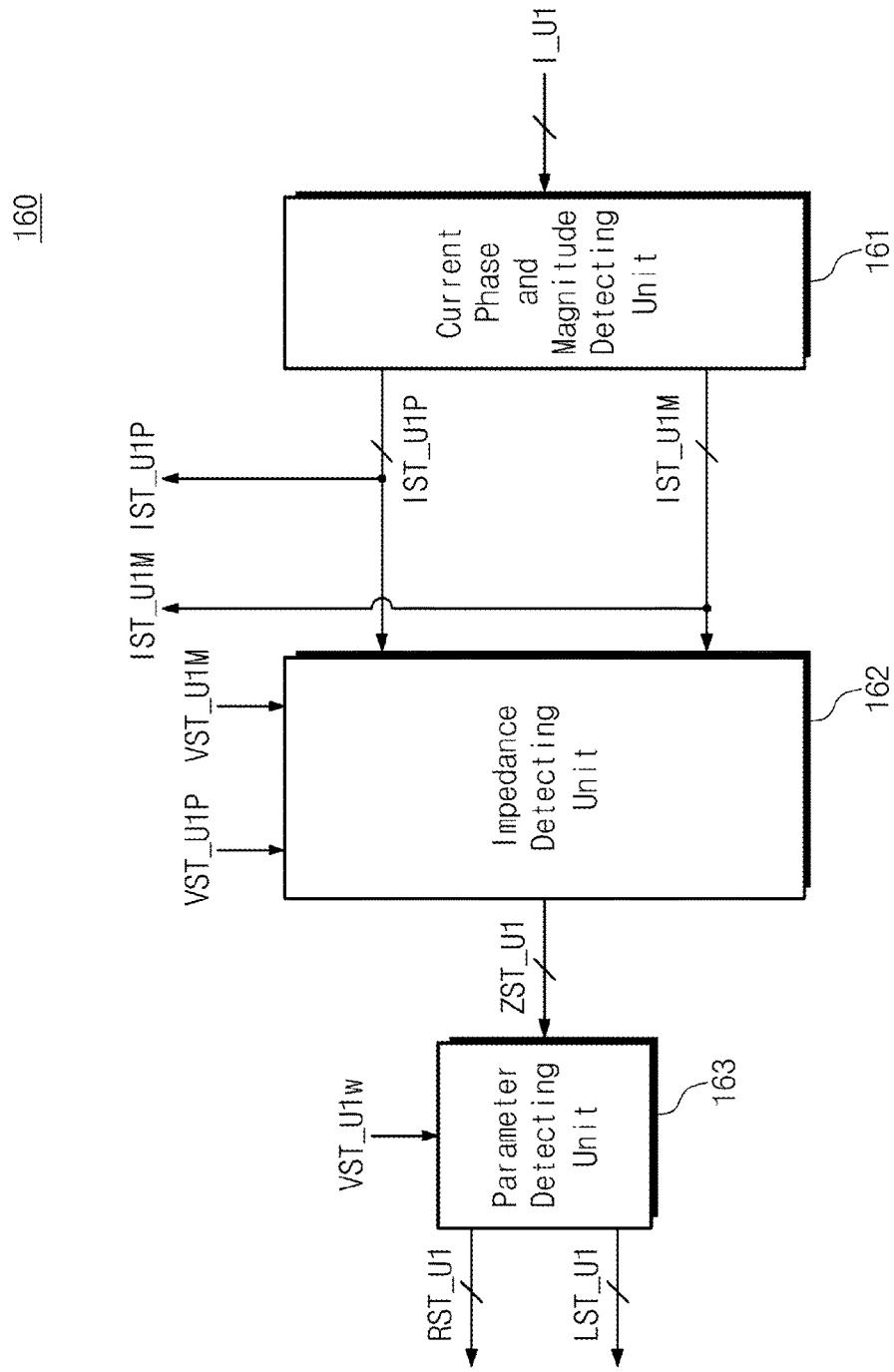
FIG. 6 illustrates a calculating unit according to an embodiment of the inventive concept.

FIG. 6 is a block diagram of the calculating unit 160 according to an embodiment of the invention. For example, a part of the calculating unit 160 related to the U-phase is illustrated in FIG. 6. For conciseness of explanation, it is assumed that the internal structure of the PWM inverter 120 is the same as that illustrated in FIG. 2. Other parts of the current detecting unit 160 related to the V- and W-phases may have the same structure as that shown in FIG. 6. The calculating unit 160 includes a current phase and magnitude detecting unit 161, an impedance detecting unit 162, and a parameter detecting unit 163.

Referring to FIGS. 1 and 6, the current phase and magnitude detecting unit 161 may receive information I-U1 on the U-phase current I_U of the BLDC motor 130 to calculate information on the phase IST_U1P and magnitude IST_U1M of the U-phase current I_U. For example, a method for obtaining the phase of the U-phase current I_U includes a zero-crossing detection method for detecting zero-crossing portions of each signal to extract the phase, a method for converting each signal to a two-phase signal through a stationary shaft conversion to calculate an arctangent value, a method (SRF-PLL) for controlling an invalid component to be 0 through a rotary shaft conversion to extract the phase. For example, a method for obtaining a magnitude of the U-phase current I_U includes a method of storing a magnitude of a part where signals of two phases except a target phase of detection among three phases are consistent, and a method for extracting a magnitude through a rotary shaft conversion (i.e. dq conversion)

For example, in the first operation mode, the current phase and magnitude detecting unit 161 may output phase information IST_U1P and magnitude information IST_U1M of the U-phase current, which are calculated by using the above-described methods, to the motor driving circuit 110 and impedance detecting unit 162. In the second operation mode, the phase information IST_U1P and magnitude information IST_U1M of the U-phase current may be output only to the motor driving circuit 110 and not to the impedance detecting unit 162.

The impedance detecting unit 162 may receive information VST on the U-phase voltage U, for example, phase information VST_U1P and magnitude information VST_U1M, output from the motor driving circuit 110 in the first operation mode in addition to the phase information IST_U1P and the magnitude information IST_U1M of the U-phase current I_U, and calculate U-phase impedance information ZST_U1. A method where the impedance detecting unit 162 calculates the impedance information ZST_U1 is defined as Equation (7).

$$Z = \frac{|V| \angle \theta v}{|I| \angle \theta i} \qquad (7)$$
$$= \frac{|V|}{|I|} \angle (\theta v - \theta i)$$
$$= \frac{|V|}{|I|} \cos(\theta v - \theta i) + j \frac{|V|}{|I|} \sin(\theta v - \theta i)$$

$$= R + jwL$$

In Equation (7), |V| denotes information VST_U1M on the magnitude of the U-phase voltage U, θv denotes the information VST_U1P on the phase of the U-phase voltage U. |I| denotes the information IST_U1M on the magnitude of the U-phase current I_U, and θi denotes the information IST_U1P on the phase of the U-phase current I_U.

The impedance detecting unit 162 calculates the U-phase impedance information ZST_U1 of the BLDC motor 130 with Equation (7) and output the calculated U-phase impedance information ZST_U1 to the parameter detecting unit 163. However, in the second operation mode, the impedance detecting unit 162 may not conduct calculation using Equation (7) and may neglect a set of information VST_U1P and VST_U1M on the voltage and a set of information IST_U1P and IST_U1M on the current.

The parameter detecting unit 163 receives the U-phase impedance information ZST_U1 and the information VST on the U-phase voltage, for example, information VST_U1w on a U-phase frequency and calculates the information RST_U1 on U-phase resistance and information LST_U1 on U-phase inductance. The parameter detecting unit 163 may output, as the parameter information PST on each phase in the BLDC motor, the calculated information RST_U1 on the U-phase resistance and information LST_U1 on the U-phase inductance to the motor driving circuit 110.

Similarly, through the process illustrated in FIG. 6, a set of information I_V1 and I_W1 on the V- and W-phase currents may be calculated as a set of information RST_V1 and LST_V1 on the V-phase resistance and inductance of the BLDC motor 130, and a set of information RST_W1 and LST_W1 on the W-phase resistance and inductance in the BLDC motor 130. In addition, the parameter detecting unit 163 may output, as the parameter information PST on the V- and W-phases, a set of information RST_V1 and LST_V1 on the calculated V-phase resistance and inductance, and a set of information RST_W1 and LST_W1 on the calculated W-phase resistance and inductance to the motor driving circuit 110. In addition, when the inside of the PWM inverter 120 is configured as illustrated in FIGS. 3 and 4, the calculating unit 160 may receive the information on each phase current through the process illustrated in FIG. 6 and output parameter information PST of each phase to the motor driving circuit 110.

In the first operation mode of the BLDC motor system 100 according to an embodiment of the inventive concept, the first frequency of the first three-phase voltages U, V, and W applied to the BLDC motor 130 may have a frequency different from the operation frequency of the BLDC motor 130. This is because when the three-phase voltages U, V, and W having the operation frequency are applied to operate the BLDC motor 130, accurate parameter information is not detected due to a back EMF generated when the rotor of the BLDC motor 130 moves. Accordingly, the first frequency of the first three-phase voltages U, V, and W applied to the BLDC motor 130 means a frequency higher than the operation frequency of the BLDC motor 130, which allows the BLDC motor 130 not to operate. For example, the control signal CTRL may include information on the first operation mode of the BLDC motor 130. In the first operation mode, the magnitude and frequency of the first three-phase voltages U, V, and W output to the BLDC motor 130 are determined by the motor driving circuit 110 on the basis of the control signal CTRL. In addition, the information VST on the magnitude, phase, and frequency of the first three-phase voltages U, V, and V, which are determined by the motor driving unit 110, may be output to the calculating unit 160. In detail, the U-phase voltage among the first three-phase voltages U, V, and W, which are determined according to the control signal CTRL and applied to the BLDC motor 130, is exemplarily defined as the following Equation (8).

$$U = k \times M \times \sin\theta v \times VDD \tag{8}$$

In Equation (8), a constant k is determined by considering a dead-time considered at the time of PWM signal generation and an ON resistance of a power device. The constant k may be adjusted in order to reduce an error generated at the time of parameter detection. A voltage modulation index M is determined with a driving manner and duty ratio of PWM. A phase θv is determined according to a setting of the motor driving circuit 110 and defined as the following Equation (9) that is a function of a frequency ω and a time t.

$$\theta v = w \times t \tag{9}$$

When the three phases of the BLDC motor 130 are all driven, a power voltage VDD corresponds to a half of a magnitude of DC voltage applied through the power node 121. The power voltage VDD corresponds to a magnitude of DC voltage applied through the power node 121.

The motor driving circuit 110 may receive the parameter information PST on each phase in the BLDC motor 130, which is calculated by the calculating unit 160 and output from the parameter detecting circuit 140, for example, information on the U-phase resistance R_U and U-phase inductance L_U. In the first operation mode, the motor driving circuit 110 may calculate a three-phase back EMF on the basis of the parameter information PST on parameters of each phase in the BLDC motor, information VST on the three-phase voltages, and information IST on three-phase currents output from the calculating unit 160, and may detect position information on the rotor of the BLDC motor 130.

In other words, the BLDC motor system 100 may simultaneously detect parameters on each phase in the BLDC motor 130. In addition, when the simultaneously detected parameters on each phase are compared and determined to be unbalanced, the BLDC motor system 100 may determine a failure of the BLDC motor system 100. In addition, when the simultaneously detected parameters on each phase are compared and determined to be unbalanced, the BLDC motor system 100 may compensate for an operation of the BLDC motor system 100.

For example, the U-phase back EMF E_U generated from the BLDC motor 130 is expressed as the following Equation (10).

$$E\_U = (V\_U - V\_N) - L\_U \cdot \frac{dI\_U}{dt} - R\_U \cdot I\_U \tag{10}$$

Referring to Equation (10), E_U denotes the U-phase back EMF, V_U denotes a U-phase voltage level applied to the BLDC motor 130, V_N denotes a voltage at a neutral point, L_U denotes a U-phase inductance value of the BLDC motor 130, R_U denotes a U-phase resistance value, and I_U denotes a U-phase current.

For example, the V-phase back EMF E_V generated from the BLDC motor 130 is expressed as the following Equation (11).

$$E\_V = (V\_V - V\_N) - L\_V \cdot \frac{dI\_V}{dt} - R\_V \cdot I\_V \qquad (11)$$

Referring to Equation (11), E_V denotes the V-phase back EMF, V_V denotes a V-phase voltage level applied to the BLDC motor 130, V_N denotes a voltage at a neutral point, L_V denotes a V-phase inductance value of the BLDC motor 130, R_V denotes a V-phase resistance value, and I_V denotes a V-phase current.

For example, the W-phase back EMF E_W generated from the BLDC motor 130 is expressed as the following Equation (12).

$$E\_W = (V\_W - V\_N) - L\_W \cdot \frac{dI\_W}{dt} - R\_W \cdot I\_W \qquad (12)$$

Referring to Equation (12), E_W denotes the W-phase back EMF, V_W denotes a W-phase voltage level applied to the BLDC motor 130, V_N denotes a voltage at a neutral point, L_W denotes a W-phase inductance value of the BLDC motor 130, R_W denotes a W-phase resistance value, and I_W denotes a W-phase current.

In the second operation mode, the motor driving circuit 110 may use the parameter information PST on parameters of each phase in the BLDC motor, which is pre-calculated and stored in the first operation mode. For example the motor driving circuit 110 may calculate a three-phase back EMF on the basis of the parameter information PST on parameters of each phase, which are calculated in the first operation mode and stored in the motor driving circuit 110, information VST on the three-phase voltages, and information IST on three-phase currents output from the calculating unit 160, and detect the position information on the rotor of the BLDC motor 130.

In addition, in order to individually detect the parameters on each phase in the BLDC motor 130, the BLDC motor system 100 may sequentially conduct detection of U-V phase, V-W phase, and W-U phase parameters. Referring to FIGS. 1 and 2, a description will be provided in detail for a method that the BLDC motor system 100 individually detects parameters of each phase of the BLDC motor 130. At this point, the internal structure of the PWM inverter 120 is the same as that shown in FIG. 2, and the inside of the BLDC motor 130 is assumed to be configured in Y-connection. In addition, when the parameters on each phase in the BLDC motor 130 are individually detected, the foregoing voltage information VST and current information IST are also used to detect the parameters.

The BLDC motor system 100 may individually detect the parameters on each phase in the BLDC motor 130 through the following Equations (13) to (27). In addition, when the simultaneously detected parameters on each phase are compared and determined to be unbalanced, the BLDC motor system 100 may determine a failure of the BLDC motor system 100. In addition, when the simultaneously detected parameters on each phase are compared and determined to be unbalanced, the BLDC motor system 100 may compensate for an operation of the BLDC motor system 100.

Through the following Equations (13) to (27), a description will be provided in detail for a method that the BLDC motor system 100 individually obtains the U-phase parameters R_U and L_U, V-phase parameters R_V and L_V, and W-phase parameters R_W and L_W of the BLDC motor 130.

For example, the BLDC motor system 100 may detect a U_V phase parameter Z_UV of the BLDC motor 130. To this end, the BLDC motor system 100 may drive only the switches TR1 and TR5 related to the U_V phase in the PWM inverter 120 and detect the U_V phase parameter Z_UV by using a current flowing through the U_V phase.

$$Z\_UV = R\_UV + jwL\_UV \qquad (13)$$

Referring to Equation (13), a real part of the U_V phase parameter Z_UV is formed of a U_V phase resistance value R_UV of the BLDC motor 130, and an imaginary part thereof is formed of a U_V phase inductance value L_UV of the BLDC motor 130. At this point, the U_V phase resistance value R_UV of the BLDC motor 130 is defined as the following Equation (14).

$$R\_UV = R\_U + R\_V \qquad (14)$$

Referring to Equation (14), the U_V phase resistance value R_UV of the BLDC motor 130 corresponds to a sum of the U-phase resistance value R_U and V-phase resistance value R_V.

At this point, the U_V phase inductance value L_UV of the BLDC motor 130 is defined as the following Equation (15).

$$L\_UV = L\_U + L\_V \qquad (15)$$

Referring to Equation (15), the U_V phase inductance value L_UV of the BLDC motor 130 corresponds to a sum of the U-phase inductance value L_U and V-phase inductance value L_V.

For example, the BLDC motor system 100 may drive only the switches TR2 and TR6 related to the V_W phase in the PWM inverter 120 and detect the V_W phase parameter Z_VW by using a current flowing through the V_W phase.

$$Z\_VW = R\_VW + jwL\_VW \qquad (16)$$

Referring to Equation (16), a real part of the V_W phase parameter Z_VW is formed of a V_W phase resistance value R_VW of the BLDC motor 130, and an imaginary part thereof is formed of a V_W phase inductance value L_VW of the BLDC motor 130. At this point, the V_W phase resistance value R_UV of the BLDC motor 130 is defined as the following Equation (17).

$$R\_VW = R\_V + R\_W \qquad (17)$$

Referring to Equation (17), the V_W phase resistance value R_VW of the BLDC motor 130 corresponds to a sum of the V-phase resistance value R_V and W-phase resistance value R_W.

At this point, the U_V phase inductance value L_UV of the BLDC motor 130 is defined as the following Equation (18).

$$L\_VW = L\_V + L\_W \qquad (18)$$

Referring to Equation (18), the V_W phase inductance value L_VW of the BLDC motor 130 corresponds to a sum of the V-phase inductance value L_V and W-phase inductance value L_W.

For example, the BLDC motor system 100 may drive only the switches TR3 and TR4 related to the W_U phase in the PWM inverter 120 and detect the W_U phase parameter Z_WU by using a current flowing through the W_U phase.

$$Z\_WU = R\_WU + jwL\_WU \qquad (19)$$

Referring to Equation (19), a real part of the W_U phase parameter Z_WU is formed of a W_U phase resistance value R_WU of the BLDC motor 130, and an imaginary part thereof is formed of a W_U phase inductance value L_WU of the BLDC motor 130. At this point, the W_U phase resistance value R_WU of the BLDC motor 130 is defined as the following Equation (20).

$$R\_WU = R\_W + R\_U \tag{20}$$

Referring to Equation (20), the W_U phase resistance value R_WU of the BLDC motor 130 corresponds to a sum of the W-phase resistance value R_W and U-phase resistance value R_U.

At this point, the W_U phase inductance value L_WU of the BLDC motor 130 is defined as the following Equation (21).

$$L\_WU = L\_W + L\_U \tag{21}$$

Referring to Equation (21), the W_U phase inductance value L_WU of the BLDC motor 130 corresponds to a sum of the W-phase inductance value L_W and U-phase inductance value L_U.

Using Equations (13) to (21), the U-phase parameters R_U and L_U are defined as the following Equations (22) and (23).

$$R\_U = \frac{R\_UV + R\_WU - R\_VW}{2} \tag{22}$$

$$L\_U = \frac{L\_UV + L\_WU - L\_VW}{2} \tag{23}$$

Using Equations (13) to (21), the V-phase parameters R_V and L_V are defined as the following Equations (24) and (25).

$$R\_V = \frac{R\_UV + R\_VW - R\_WU}{2} \tag{24}$$

$$L\_V = \frac{L\_UV + L\_VW - L\_WU}{2} \tag{25}$$

Using Equations (13) to (21), the W-phase parameters R_W and L_W are defined as the following Equations (26) and (27).

$$R\_W = \frac{R\_VW + R\_WU - R\_UV}{2} \tag{26}$$

$$L\_W = \frac{L\_VW + L\_WU - L\_UV}{2} \tag{27}$$

Figure 7:
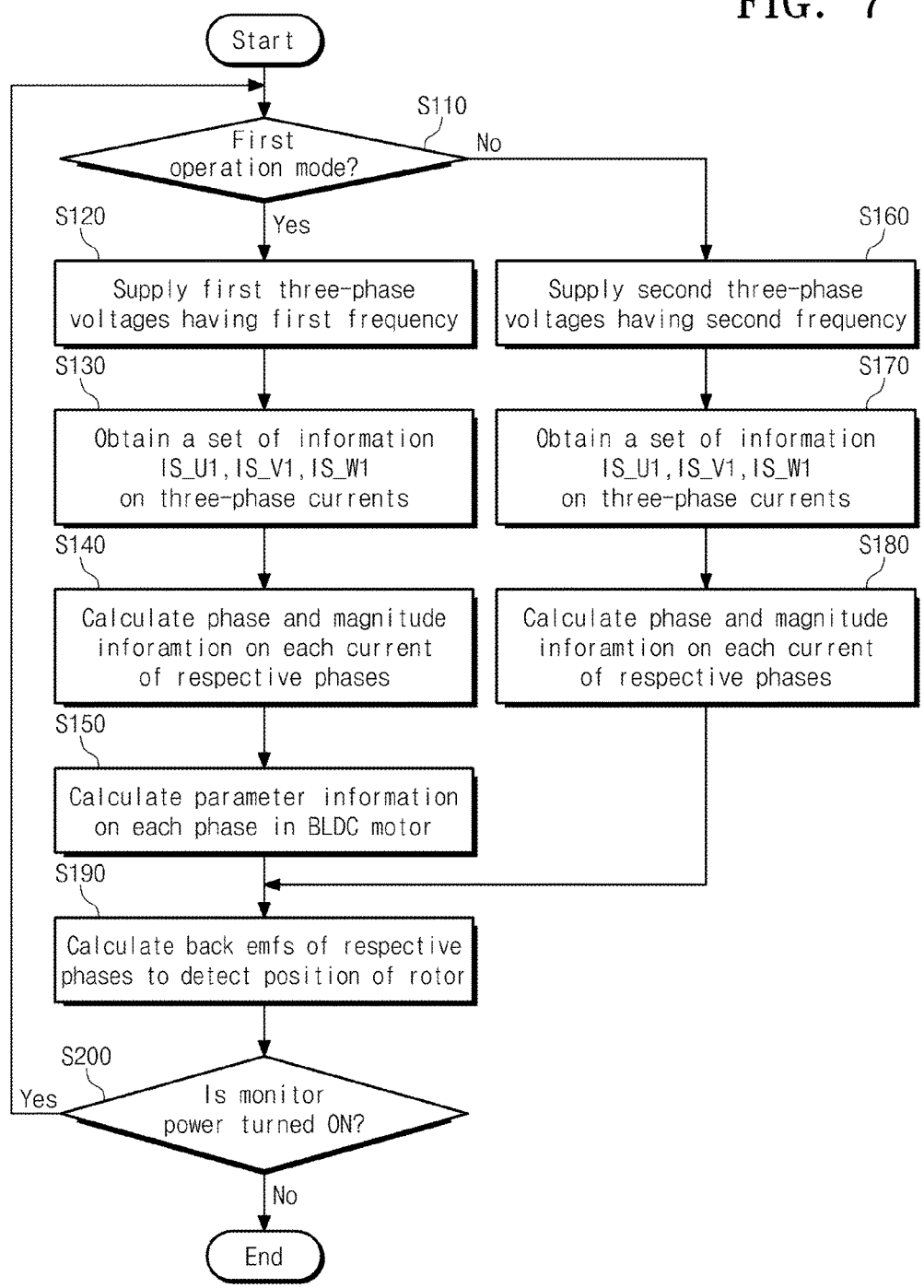
FIG. 7 is flowchart of an operation method of a BLDC motor system according to an embodiment of the inventive concept.

FIG. 7 is an exemplary flowchart illustrating an operation method of the motor driving circuit 110, PWM inverter 120, BLDC motor 130, and parameter detecting circuit 140 illustrated in FIG. 1. For conciseness of explanation, it is assumed that the internal structure of the PWM inverter 120 is the same as that illustrated in FIG. 2. Referring to FIGS. 1, 2, and 5 to 7, in operation S110, it is determined whether the BLDC motor system 100 is in the first or second operation mode through the control signal CTRL.

In operation S120, in the first operation mode, the BDLC motor system 100 supplies the first three-phase voltages U, V, and W having the first frequency to the BLDC motor 130 according to the first switching signals S_U1, S_U2, S_V1, S_V2, S_W1, and S_W2.

In operation S130, the BLDC motor system 100 receives the sensing voltage VS, for a case of FIG. 2, the sensing voltages VS_U1, VS_V1, and VS_W1, output from the inside of the PWM inverter 120, and calculates information I_U1, I_V1, and I_W1 on the three-phase currents I_U, I_V, and I_W of the BLDC motor 130.

In operation S140, the BLDC motor system 100 receives the information I_U1, I_V1, and I_W1 on the three-phase currents I_U, I_V, and I_W of the BLDC motor 130, and calculates the information IST on the three-phase currents I_U, I_V, and I_W, for example, for the case of the U-phase, the phase information IST_U1P and magnitude information IST_U1M on the U-phase current I_U.

In operation S150, the BLDC motor system 100 receives the information IST on the three-phase currents I_U, I_V, and I_W, for example, for the case of the U-phase, the phase information IST_U1P and magnitude information IST_U1M on the U-phase current I_U, and the information VST on the three-phase voltages U, V, and W, for example, the phase information VST_U1P, magnitude information VST_U1M, and the frequency information VST_U1w on the V-phase voltage U, and calculate the parameter information PST on each phase in the BLDC motor 130.

In operation S160, in the second operation mode, the BDLC motor system 100 supplies the second three-phase voltages U, V, and W having the second frequency to the BLDC motor 130 according to the second switching signals S_U1, S_U2, S_V1, S_V2, S_W1, and S_W2.

In operation S170, the BLDC motor system 100 receives the sensing voltage VS, for the case of FIG. 2, the sensing voltages VS_U1, VS_V1, and VS_W1, output from the inside of the PWM inverter 120, and calculates information I_U1, I_V1, and I_W1 on the three-phase currents I_U, I_V, and I_W of the BLDC motor 130.

In operation S180, the BLDC motor system 100 receives the information I_U1, I_V1, and I_W1 on the three-phase currents I_U, I_V, and I_W of the BLDC motor 130, and calculates the information IST on the three-phase currents I_U, I_V, and I_W, for example, for the case of the U-phase, the phase information IST_U1P and magnitude information IST_U1M on the U-phase current I_U.

In operation S190, the BLDC motor system 100 may detect the rotor position of the BLDC motor 130 by calculating the back EMFs expressed in Equations (10) to (12) by using the parameter information PST on the parameters of each phase in the BLDC motor, the information VST on the three-phase voltages U, V, and W, and the information IST on the three-phase currents I_U, I_V, and I_W.

In operation 5200, when the motor power is in an ON state, operation S110 is conducted. When the motor power is turned OFF, the operation of the embodiment of the inventive concept is terminated.

According to embodiments of the inventive concept, a BLDC motor system including a parameter detecting circuit having an improved accuracy and reliability, and an operating method thereof are provided.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A BrushLess Direct Current (BLDC) motor system comprising:
 a motor driving circuit configured to control a pulse-width-modulation (PWM) inverter in a first operation mode or a second operation mode according to a control signal, and output a switching signal according to the first or second operation mode;

the PWM inverter configured to receive the switching signal to output first three-phase voltages having a first frequency in the first operation mode, and output second three-phase voltages having a second frequency in the second operation mode;

a sensorless BLDC motor configured to receive the first three-phase voltages in the first operation mode, and receive the second three-phase voltages in the second operation mode; and a parameter detecting circuit configured to calculate parameter information on the sensorless BLDC motor in the first operation mode by using sensing voltages sensed in the PWM inverter, wherein the motor driving circuit is configured to calculate position information of a rotor in the sensorless BLDC motor, by
 in the first operation mode, calculating a three-phase back electromotive force (EMF) using the parameter information output from the parameter detecting circuit, and
 in the second operation mode, calculating the three-phase back EMF using the parameter information that is calculated by the parameter detecting circuit in the first operation mode.

2. The BLDC motor system of claim 1, wherein the PWM inverter comprises:
 first and fourth power devices connected in series between a power node and a ground node;
 second and fifth power devices connected in parallel to the first and fourth power devices and connected in series between the power node and the ground node;
 third and sixth power devices connected in parallel to the second and fifth power devices and connected in series between the power node and the ground node;
 a first sensing device having a gate and two nodes, one node of which is connected to a point where one node of the second power device and one node of the fifth power device intersect, the gate of which is shared with the fifth power device, and the other node of which is connected in series to a first sensing resistor;
 a second sensing device having a gate and two nodes, one node of which is connected to a point where one node of the third power device and one node of the sixth power device intersect, the gate of which is shared with the sixth power device, and the other node of which is connected in series to a second sensing resistor;
 a third sensing device having a gate and two nodes, one node of which is connected to a point where one node of the first power device and one node of the fourth power device intersect, the gate of which is shared with the fourth power device, and the other node of which is connected in series to a third sensing resistor;
 the first sensing resistor connected in series between the other node of the first sensing device and the ground node;
 the second sensing resistor connected in series between the other node of the second sensing device and the ground node; and
 the third sensing resistor connected in series between the other node of the third sensing device and the ground node.

3. The BLDC motor system of claim 2, wherein each of the first to sixth power devices and the first to third sensing devices is a bidirectional transistor.

4. The BLDC motor system of claim 2, further comprising:
 a fourth sensing device having a gate and two nodes, one node of which is connected to the power node, the gate of which is shared with the first power device, and the other node of which is connected in series to a fourth sensing resistor;
 a fifth sensing device having a gate and two nodes, one node of which is connected to the power node, the gate of which is shared with the second power device, and the other node of which is connected in series to a fifth sensing resistor;
 a sixth sensing device having a gate and two nodes, one node of which is connected to the power node, the gate of which is shared with the third power device, and the other node of which is connected in series to a sixth sensing resistor;
 the fourth sensing resistor connected in series between the other node of the fourth sensing device and one node of the first power device;
 the fifth sensing resistor connected in series between the other node of the fifth sensing device and the other node of the second power device; and
 the sixth sensing resistor connected in series between the other node of the sixth sensing device and the other node of the third power device.

5. The BLDC motor system of claim 4, wherein each of the first to sixth power devices and the first to sixth sensing devices is a bidirectional transistor.

6. The BLDC motor system of claim 4, wherein each of the first to sixth power devices and the first to sixth sensing devices is a bidirectional transistor.

7. The BLDC motor system of claim 1, wherein the parameter detecting circuit comprises:
 a current detecting unit configured to output information on three-phase currents of the BLDC motor by using the sensing voltages; and
 a calculating unit configured to calculate the parameter information on the BLDC motor by using the information on the three-phase currents output from the current detecting unit and information on three-phase voltages output from the motor driving circuit and preset to be applied to three-phases.

8. The BLDC motor system of claim 1, wherein when the parameters of the BLDC motor, which are output from the parameter detecting circuit, are unbalanced, the motor driving circuit compensates for an operation of the BLDC motor.

9. The BLDC motor system of claim 1, wherein the first frequency is higher than the second frequency.

10. The BLDC motor system of claim 1, wherein the PWM inverter comprises:
 first and fourth power devices connected in series between a power node and a ground node;
 second and fifth power devices connected in parallel to the first and fourth power devices and connected in series between the power node and the ground node;
 third and sixth power devices connected in parallel to the second and fifth power devices and connected in series between the power node and the ground node;
 a first sensing device having a gate and two nodes, one node of which is connected to the power node, the gate of which is shared with the first power device, and the other node of which is connected in series to a first sensing resistor;
 a second sensing device having a gate and two nodes, one node of which is connected to the power node, the gate of which is shared with the second power device, and the other node of which is connected in series to a second sensing resistor;
a third sensing device having a gate and two nodes, one node of which is connected to the power node, the gate of which is shared with the third power device, and the other node of which is connected in series to a third sensing resistor;
the first sensing resistor connected in series between the other node of the first sensing device and one node of the first power device;
the second sensing resistor connected in series between the other node of the second sensing device and one node of the second power device; and
the third sensing resistor connected in series between the other node of the third sensing device and one node of the third power device.

11. The BLDC motor system of claim 10, wherein each of the first to sixth power devices and the first to third sensing devices is a bidirectional transistor.

12. The BLDC motor system of claim 1, wherein
the first three-phase voltages comprises U-phase, V-phase, and W-phase voltages, and
the PWM inverter sequentially outputs the U-phase, V-phase, and W-phase voltages in the first operation mode.

13. The BLDC motor system of claim 12, wherein when the U-phase voltage, V-phase, and W-phase voltages are sequentially output, the parameter detecting circuit sequentially calculates first to third information and sequentially calculates the parameter information according to the first to third information.

14. The BLDC motor system of claim 1, wherein
the first three-phase voltages comprises U-phase, V-phase, and W-phase voltages, and
the PWM inverter simultaneously outputs the U-phase, V-phase, and W-phase voltages in the first operation mode.

15. An operation method of a BrushLess Direct Current (BLDC) motor system that includes a BLDC motor and a pulse-width-modulation (PWM) inverter configured to control the BLDC motor, the operation method comprises:
in a first operation mode,
supplying, by the BLDC motor system, first three-phase voltages having a first frequency to the BLDC motor,
obtaining, by the BLDC motor system, first information on three-phase currents of each phase in the BLDC motor according to the first three-phase voltages,
calculating, by the BLDC motor system, parameter information on each phase in the BLDC motor by using the first information, and
detecting, by the BLDC motor system, a position of a rotor in the BLDC motor by calculating a three-phase back electromotive force (EMF) using the calculated parameter information; and
in a second operation mode,
supplying, by the BLDC motor system, second three-phase voltages having a second frequency to the BLDC motor,
obtaining, by the BLDC motor system, second information on three-phase currents of each phase in the BLDC motor according to the second three-phase voltages, and
detecting, by the BLDC motor system, the position of the rotor in the BLDC motor by calculating the three-phase back EMF using the parameter information that is calculated in the first operation mode.

16. The operation method of claim 15, where the parameter information comprises impedance values of three-phase in the BLDC motor.

* * * * *